(12) United States Patent
Johnson et al.

(10) Patent No.: US 8,963,735 B2
(45) Date of Patent: Feb. 24, 2015

(54) TURBINE METER PRE-SCALING TERMINAL BLOCK ELECTRONICS

(75) Inventors: James A. Johnson, Savage, MN (US); Richard Nelson, Chanhassen, MN (US)

(73) Assignee: Rosemount Inc., Bloomington, MN (US)

( * ) Notice: Subject to any disclaimer, the term of this patent is extended or adjusted under 35 U.S.C. 154(b) by 666 days.

(21) Appl. No.: 13/307,125

(22) Filed: Nov. 30, 2011

(65) Prior Publication Data

US 2013/0136204 A1 May 30, 2013

(51) Int. Cl.
*G08B 23/00* (2006.01)

(52) U.S. Cl.
USPC .............. 340/870.02; 340/870.01; 340/539.1; 340/539.11; 340/506; 340/3.1; 607/60; 600/509

(58) Field of Classification Search
USPC ............. 340/870.01, 539.1, 539.11, 506, 3.1; 607/60; 600/509
See application file for complete search history.

(56) References Cited

U.S. PATENT DOCUMENTS

| | | | |
|---|---|---|---|
| 5,015,949 A | 5/1991 | Koch et al. | |
| 5,451,937 A | 9/1995 | Olson et al. | |
| 6,453,200 B1 * | 9/2002 | Koslar | 607/60 |
| 6,502,468 B1 | 1/2003 | Thornborough | |
| 6,662,002 B2 | 12/2003 | Kubo et al. | |
| 2005/0258817 A1 | 11/2005 | Horikawa | |
| 2007/0026832 A1 | 2/2007 | Someya | |
| 2007/0285224 A1 | 12/2007 | Karschnia et al. | |
| 2008/0174384 A1 | 7/2008 | Petrovic et al. | |
| 2011/0084738 A1 | 4/2011 | Suk/Suh et al. | |
| 2014/0084700 A1 * | 3/2014 | Anderson et al. | 307/104 |

FOREIGN PATENT DOCUMENTS

WO 2011126444 A1 10/2011

OTHER PUBLICATIONS

International Search Report and Written Opinion of the Patent Cooperation Treaty Office in application No. PCT/US2012/064964 dated Mar. 18, 2013.

* cited by examiner

*Primary Examiner* — Daryl Pope
(74) *Attorney, Agent, or Firm* — Kinney & Lange, P.A.

(57) ABSTRACT

An electronic circuit for converting higher-frequency output signals from a sensor into lower-frequency input signals for a discrete input wireless transmitter. The circuit includes a differential amplifier, a digital comparator, a digital frequency divider, and a transistor switch. The differential amplifier amplifies the sensor signals as a function of a frequency of the sensor signals. The digital comparator generates a square wave signal by comparing the amplified sensor signals to a fixed reference voltage. The digital frequency divider generates a lower-frequency signal by dividing the square wave signal. The transistor switch generates the lower-frequency input signals for the discrete input wireless transmitter by switching as a function of the lower-frequency signal from the digital frequency divider.

21 Claims, 3 Drawing Sheets

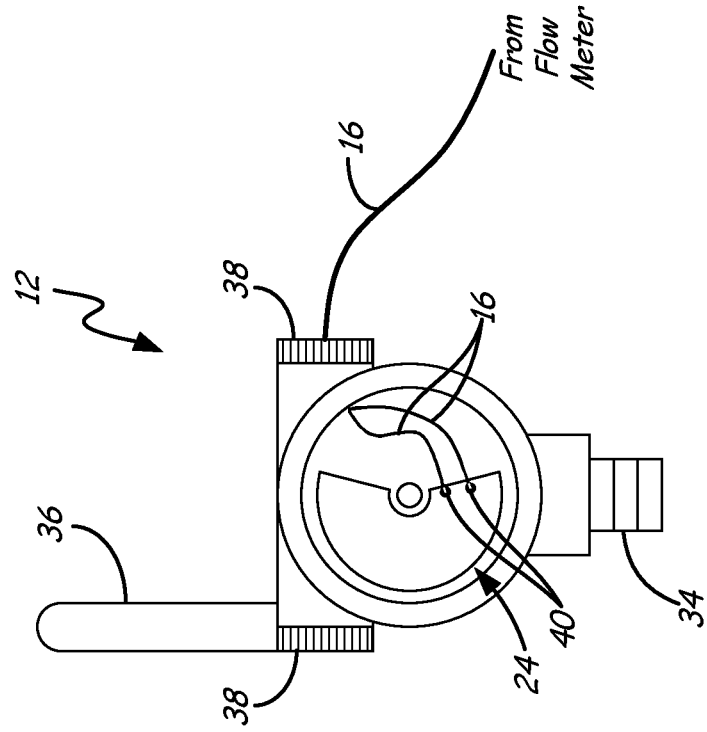
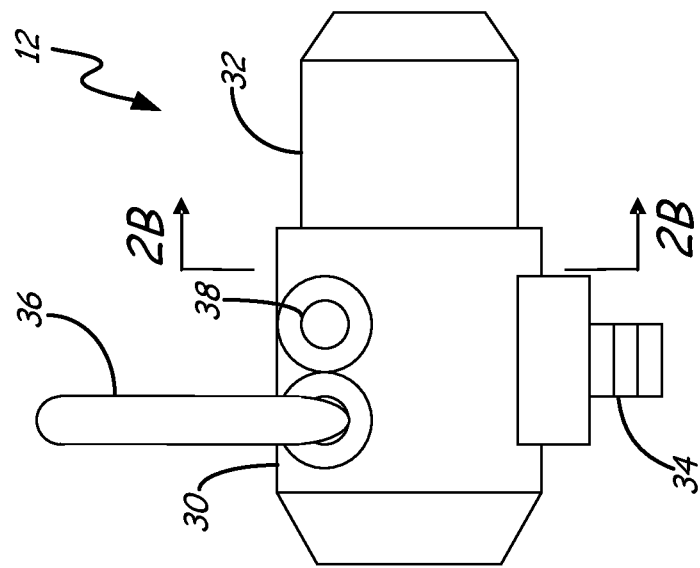

TURBINE METER PRE-SCALING TERMINAL BLOCK ELECTRONICS

BACKGROUND

The present invention relates generally to field devices for process measurement and control. Specifically, the invention concerns input signal conversion electronics for a discrete input transmitter.

Field devices cover a broad range of process management devices that measure and control parameters such as pressure, temperature, and flow rate. A transmitter is a type of field device in communication with a transducer, for example a sensor or an actuator, and also in communication with a remote control or monitoring device, such as a computer. The output signal of a sensor, for example, is generally insufficient to communicate effectively with a remote control or monitoring device. A transmitter bridges the gap by receiving the communication from the sensor, converting the signal to a form more effective for longer distance communication, for example a modulated 4-20 mA current loop signal, or a wireless protocol signal, and transmitting the converted signal over a current loop or through a wireless field device network to the remote control or monitoring device.

Wireless field devices are becoming prevalent in industrial applications. As components of wireless field device networks, wireless devices extend the reach of control or process monitoring systems beyond that of wired devices to locations where wiring may be difficult and expensive to provide. The use of lower power electronics and RF radios is essential for wireless network systems designed for transducer-based applications, such as a wireless field device network. Many devices in the network must be locally-powered because power utilities, such as 120V AC utilities or powered data buses, are not located nearby or are not allowed into hazardous locations where instrumentation and transducers must be located without incurring great installation expense. A common characteristic of local power sources is their limited power capacity, either stored, as in the case of a long-life battery, or produced, as in the case of a solar panel. Batteries are expected to last more than five years and preferably last as long as the life of the product.

There is a need for industrial wireless transmitters with electronics designed for low power consumption and able to communicate parameters such as pressure, temperature, and flow for process monitoring and control applications.

SUMMARY

An embodiment of the present invention is an electronic circuit for converting higher-frequency output signals from a sensor into lower-frequency input signals for a discrete input wireless transmitter. The circuit includes a differential amplifier, a digital comparator, a digital frequency divider, and a transistor switch. The differential amplifier amplifies the sensor signals as a function of a frequency of the sensor signals. The digital comparator generates a square wave signal by comparing the amplified sensor signals to a fixed reference voltage. The digital frequency divider generates a lower-frequency signal by dividing the square wave signal. The transistor switch generates the lower-frequency input signals for the discrete input wireless transmitter by switching as a function of the lower-frequency signal from the digital frequency divider.

BRIEF DESCRIPTION OF THE DRAWINGS

FIGS. 2A-2B are representative diagrams of a wireless transmitter including an embodiment of a signal-conversion circuit for a discrete input wireless transmitter of the present invention incorporated into a transmitter terminal block.

DETAILED DESCRIPTION

The present invention is a signal-conversion circuit for an industrial wireless transmitter. The circuit converts a higher-frequency pulse signal from, for example, an industrial flow meter, such as a turbine flow meter without signal conditioning, to a lower-frequency pulse signal compatible with a discrete input wireless transmitter.

A turbine flow meter, for example, a Daniel® Series 1200 Liquid Turbine Flow Meter, senses the rate of flow of a fluid through a pipe by employing a turbine rotor in the path of the fluid flow which rotates in response to the flow. This rotation causes blades of the rotor (or rim buttons positioned around the rim of the rotor) to pass through the magnetic field of a magnetic sensor, or pickoff, generating a sensor signal pulse. A series of sensor signal pulses are generated, in the form of a sinusoidal waveform, as the turbine rotor in the path of the fluid flow rotates in response to the flow. A volumetric flow rate is determined by counting the number of pulses in a period of time. High resolution turbine flow meters have several blades (or rim buttons) on the rotor. At high flow rates, this can lead to pulse output frequencies as high as 5,000 Hz or higher.

A discrete input wireless transmitter, for example, a Rosemount® 702 Wireless Discrete Transmitter, is a type of industrial wireless transmitter able to detect discrete inputs (e.g., switch open or closed) and count the number of discrete inputs before transmitting this information wirelessly through a wireless field device network to a control or monitoring system. If a discrete input wireless transmitter were modified to recognize sensor signal pulses from a turbine flow meter as discrete inputs, then the control or monitoring system would able to use changes in the count information over time to determine the flow rate in the pipe. However, discrete input wireless transmitters known in the art are limited to counting frequencies of 100 Hz or lower. This is because a wireless transmitter with electronics able to count at frequencies up to 5,000 Hz or higher would use significantly more power, greatly limiting the useful life of the wireless device. The present invention converts the higher-frequency pulses from a sensor, such as the pulses from a turbine flow meter as high as 5,000 Hz or higher, to lower-frequency discrete inputs at a rate no greater than 100 Hz, which are accurately counted and reported by a discrete input wireless transmitter.

Figure 1:
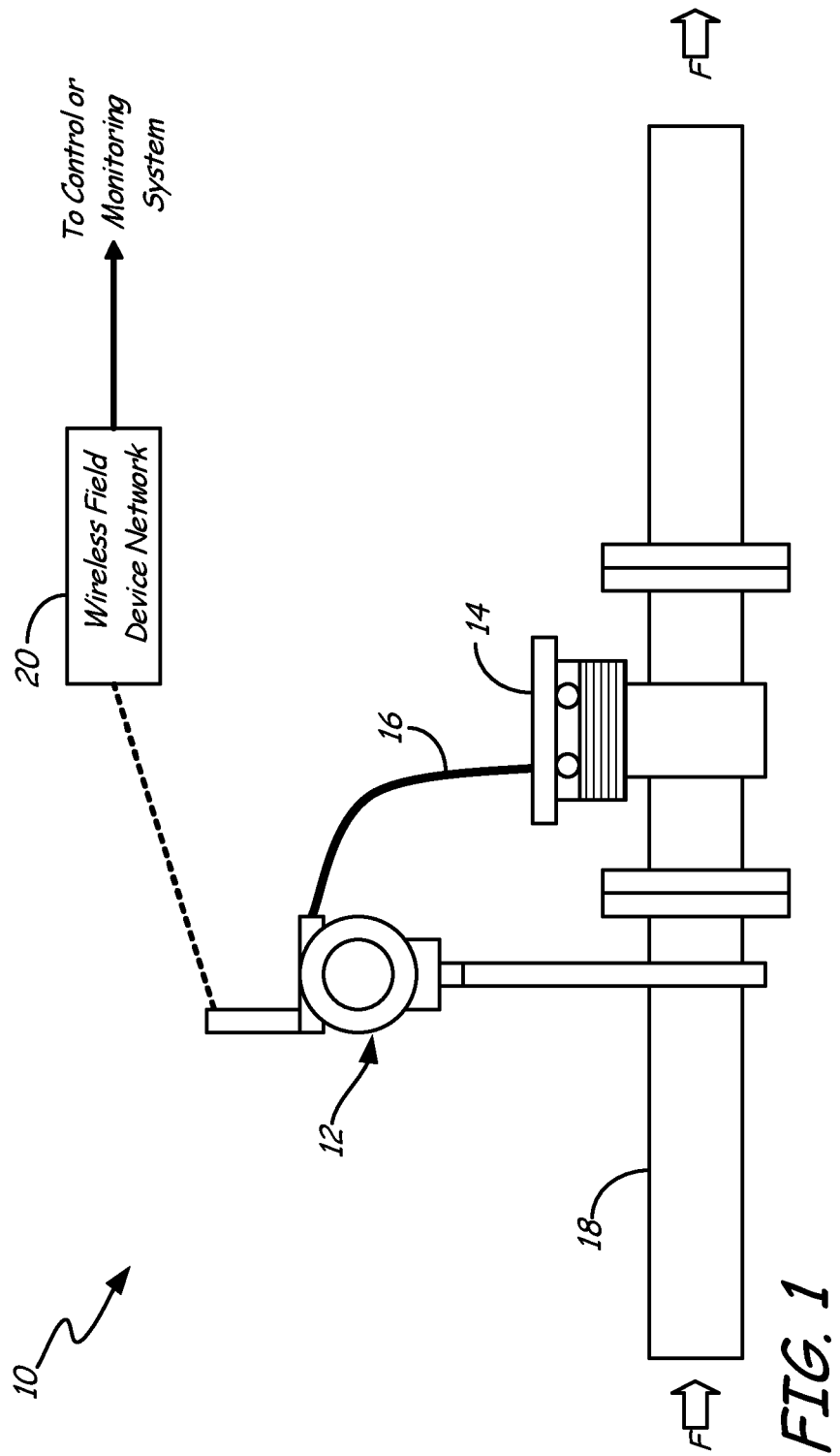
FIG. 1 is a representative diagram of a process monitoring and control system including an embodiment of a signal-conversion circuit for a discrete input wireless transmitter of the present invention.

FIG. 1 is a representative diagram of a process monitoring and control system comprising an embodiment of a signal-conversion circuit for a discrete input wireless transmitter of the present invention. FIG. 1 shows process measurement or control point 10, including discrete input wireless transmitter 12, turbine flow meter 14, sensor wires 16, and process piping 18. Also shown in FIG. 1 is wireless field device network 20. Process piping 18 contains a flow of process fluid F. Discrete input wireless transmitter 12 is a standard discrete input wireless transmitter that would normally only be able to detect and count discrete inputs at rates no greater than 100 Hz, except that discrete input wireless transmitter 12 includes the present invention embodied in terminal block 24 which includes signal-conversion circuit 26, as described in detail below in reference to FIGS. 2 and 3.

Turbine flow meter 14 is inserted into process piping 18 such that the flow of process fluid F passes through turbine flow meter 14. Discrete input wireless transmitter 12 is positioned near turbine flow meter 14. As illustrated in FIG. 1, discrete input wireless transmitter 12 is mounted on a pole attached to process piping 18. Alternatively, discrete input wireless transmitter 12 may be mounted to other hardware in the vicinity of turbine flow meter 14 or may be physically attached to turbine flow meter 14. Sensor wires 16 connect turbine flow meter 14 to discrete input wireless transmitter 12 at terminal block 24. Discrete input wireless transmitter 12 is a member of wireless field device network 20, connected to the rest of wireless field device network 20 by an industrial wireless communication protocol, for example, IEC 62951 (WirelessHART®). Wireless field device network 20 is connected by way of a gateway (not shown) to a control or monitoring system.

In operation, a rotor in turbine flow meter 14 rotates as the flow of process fluid F passes through turbine flow meter 14, generating a series of sensor signal pulses. As the flow of process fluid F increases, the frequency of the sensor signal pulses increase, as does the amplitude of the sensor signal pulses. Sensor signal pulse frequencies range from 0 Hz to as high as 5,000 Hz or higher. Sensor signal pulse amplitudes range from 40 mV to 10,000 mV or more. The sensor signal pulses from turbine flow meter 14 are conducted to discrete input transmitter 12 over sensor wires 16. At discrete input wireless transmitter 12, signal-conversion circuit 26 converts the sensor signal pulses into a series of discrete inputs within a range of 0 Hz to 100 Hz. Discrete input wireless transmitter 12 can then determine the number of sensor signal pulses from turbine flow meter 14 based on the number of discrete inputs counted per unit of time and transmit this information through wireless field device network 20 to the control or monitoring system. Alternatively, discrete input wireless transmitter 12 may transmit the number of discrete inputs counted per unit of time through wireless field device network 20 to the control or monitoring system and the control or monitoring system can determine the number of sensor signal pulses from turbine flow meter 14 based on the count of discrete inputs. Flow rate is then easily calculated from the number of sensor signal pulses from turbine flow meter 14 per unit of time.

With the present invention, discrete input wireless transmitter 12, normally unable to detect and count sensor signal pulses from turbine flow meter 14, can now accurately detect, count and report those sensor signal pulses to the control and monitoring system to provide flow rate measurement information. By converting to a lower frequency, the critical low power capabilities of discrete input wireless transmitter 12 are preserved.

FIGS. 2A-2B are representative diagrams of a wireless transmitter including an embodiment of a signal-conversion circuit for a discrete input wireless transmitter of the present invention incorporated into a transmitter terminal block. FIG. 2A is a side view of discrete input wireless transmitter 12 showing transmitter housing 30, housing cover 32, mounting post 34, antenna 36, and conduit entry 38. Transmitter housing 30 contains all of the electronics for discrete input wireless transmitter 12 necessary to receive discrete inputs, count and record the discrete inputs, and wirelessly exchange information with wireless field device network 20. Housing cover 32 attaches to transmitter housing 30 to protect electrical connections that are accessible in the field. Conduit entry 38 is one of two entry points for field wiring to connect to discrete input wireless transmitter 12 (both shown in FIG. 2B). Mounting post 34 is attached to transmitter housing 30 and may be used to attach discrete input wireless transmitter 12 to a mounting post or fixture near turbine flow meter 14. Antenna 36 is connected to transmitter housing 30.

FIG. 2B shows discrete input wireless transmitter 12 of FIG. 2A rotated about mounting post 34 and with housing cover 32 removed. As shown in FIG. 2B, discrete input wireless transmitter 12 includes terminal block 24. Terminal block 24 includes terminals 40 (two illustrated) to provide a field connection for sensor wires 16 to discrete input wireless transmitter 12. Terminal block 24 replaces a terminal block that would normally be present in discrete input wireless transmitter 12. Sensor wires 16 from turbine flow meter 14 enter one of conduit entry 38 and connect to terminals 40. In addition to providing the field connection for sensor wires 16, as would the terminal block normally present in discrete input wireless transmitter 12, terminal block 24 includes signal-conversion circuit 26 and transient protection circuit 42 as described below in reference to FIG. 3.

In operation, sensor signal pulses from turbine flow meter 14 are conducted to terminal block 24 at terminals 40 over sensor wires 16. At terminal block 24, signal-conversion circuit 26 converts the sensor signal pulses into a series of discrete inputs within a range of 0 Hz to 100 Hz and sends these discrete inputs to electronics within wireless housing 30 where they are detected and counted.

Figure 3:
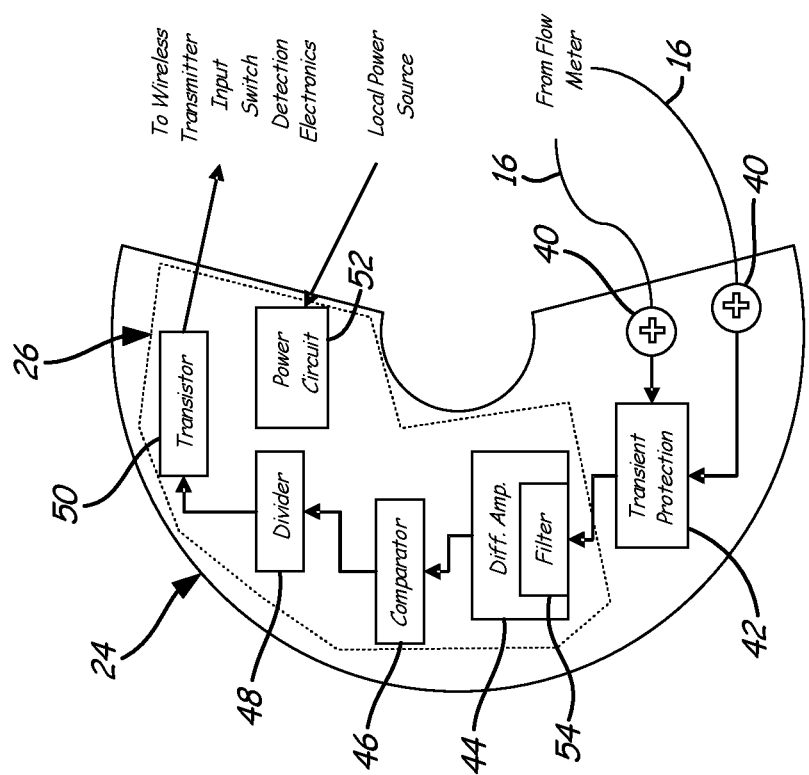
FIG. 3 is a representative diagram of an embodiment of a signal-conversion circuit for a discrete input wireless transmitter of the present invention.

FIG. 3 is a representative diagram of an embodiment of a signal-conversion circuit for a discrete input wireless transmitter of the present invention. FIG. 3 shows terminal block 24 which includes signal-conversion circuit 26, terminals 40, and transient protection circuit 42. Transient protection circuit 42 includes a passive filter for protecting discrete input wireless transmitter 12 from transient overvoltage conditions. Signal-conversion circuit 26 includes differential amplifier 44, digital comparator 46, digital frequency divider 48, transistor switch 50, and power supply circuit 52. Differential amplifier 44 includes filter 54.

Differential amplifier 44 is a variable gain amplifier such that lower-frequency signals receive greater amplification than higher-frequency signals. As noted above, as the frequency of the sensor signal pulses from turbine flow meter 14 increases, so does the amplitude of the sensor signal pulses. Thus, differential amplifier 44 will tend to equalize the amplitude of the sensor signal pulses from turbine flow meter 14 across all frequencies. Filter 54 is a low-pass filter to limit the frequencies to be differentially amplified to no more than the maximum frequency of the sensor signal pulses expected from turbine flow meter 14. Digital comparator 46 is a device known in the art that produces a square waveform in response to, for example, a sinusoidal waveform, by switching its output in response to the sinusoidal waveform crossing a fixed reference voltage. Digital frequency divider 48 is a device known in the art for generating a frequency output that is lower than a frequency input. The output frequency is reduced from the input frequency (or divided down) by a selectable factor of 2 to the power of n, where n is an integer greater than 0. For example, a 5,000 Hz sensor signal pulse would be reduced to a frequency of 78 Hz with digital frequency divider 48 set such that n=6. Transistor switch 50 is a device known in the art that switches its output in response to a change in input. For example, transistor switch 50 may be a field effect transistor (FET) with an open collector output.

Power supply circuit 52 is a device known in the art for producing power of a fixed voltage when provided with power within a range of voltages. Power supply circuit 52 is, for example, a switching regulator power supply to minimize power consumption.

As shown in FIG. 3, signal wires 16 connect to terminal block 24 at terminals 40. Transient protection circuit 42 connects terminals 40 to differential amplifier 44 at filter 54. Digital comparator 46 connects differential amplifier 44 to digital frequency divider 48. Digital frequency divider 48 is connected to transistor switch 50, which is connected the electronics within discrete input wireless transmitter 12 for detecting and counting discrete inputs. Power supply circuit 52 is connected to the local power source for discrete input wireless device 12, for example, a battery with a 7.2 V output. Power supply circuit 52 is also connected to the devices of signal-conversion circuit 26 to provide them with a fixed voltage less than the supplied voltage, for example, 3.0 V.

In operation, sensor signal pulses received at terminals 40 from sensor wires 16 are conducted to differential amplifier 44 through transient protection circuit 42. Transient protection circuit 42 filters out any transient overvoltage conditions accompanying the sensor signal pulses. At differential amplifier 44, filter 54 filters out any frequencies beyond those likely to be generated by turbine flow meter 14. Next, differential amplifier 44 amplifies lower-frequency sensor signal pulses more than higher-frequency sensor signal pulses to equalize the amplitude of the sensor signal pulses across all frequencies. This is essential, because, as noted above, the sensor signal pulses generated by turbine flow meter 14 vary greatly in amplitude, with lower-frequency sensor signal pulses having lower amplitudes and higher-frequency sensor signal pulses having higher amplitudes. Before passing to digital comparator 46 where the sinusoidal waveform of the sensor signal pulses is converted into a square waveform, the sensor signal pulses must be equalized or digital comparator 46 will only be able to generate square waveforms over a limited range of sensor signal pulse frequencies and, thus a narrow range of flow rates. The differentially amplified sensor signal pulses pass to digital comparator 46 where the sinusoidal waveform is compared to a fixed reference voltage provided by power supply circuit 52. By switching the output of digital comparator 46 in response to the sinusoidal waveform crossing the fixed reference voltage, a square waveform of the sensor signal pulses is produced. The sensor signal pulses, now in a square waveform, feed into digital frequency divider 48 where the frequency is divided by discrete powers of 2 sufficient to bring the maximum sensor signal pulse frequency to less than 100 Hz, as described above for the example where the maximum sensor signal pulse is 5,000 Hz. This brings the frequency of the sensor signal pulses into a range detectable by the low power electronics in discrete input wireless transmitter 12. Finally, the frequency-reduced sensor signal pulses are applied to transistor switch 50 to control the output of transistor switch 50. For example, if a FET with an open collector is employed for transistor switch 50, the sensor signal pulses from digital frequency divider 48 are applied to a gate of transistor switch 50 resulting in series of open and closed switch signals on the output of transistor switch 50. The open and closed switch signals are then detected by the electronics within discrete input wireless transmitter 12 as discrete inputs.

In the present invention, the discrete power of two employed by digital frequency divider 48, used to determine the factor by which the frequency of the sensor signal pulses is reduced, is a fixed value for a specific terminal block 24. Alternatively, the discrete power of two employed by digital frequency divider 48 may be user selectable by, for example, positioning circuit jumpers or switches on terminal block 24. In this way, a single terminal block 44 can be installed in discrete input wireless transmitter 12 and used for a variety of turbine flow meters 14, with different frequency maximums. The jumpers or switches may also select filters 54 of corresponding to the different frequency maximums. In any case, whichever discrete power of two is employed by digital frequency divider 48 must also be employed either in the electronics of discrete input wireless transmitter 12 or the control or monitoring system to mathematically convert a count of discrete inputs per unit time into a count of sensor signal pulses per unit time for use in determining an accurate flow rate.

The present invention provides the capability for discrete input wireless transmitter 12 to detect and count sensor signal pulses with frequencies greater much greater than 100 Hz, without significantly increasing power use. The components described above for signal-conversion circuit 26 consume very little power in operation—less than 20 microamps. In addition, by converting to a lower frequency, the critical low power capabilities of discrete input wireless transmitter 12 are preserved.

Although all embodiments of the present invention are described with a turbine flow meter employing a magnetic pick off as the source of sensor signal pulses, it is understood that the present invention applies to any source of sensor signal pulses, where the frequency of the sensor signal pulses carries the measurement information. Additional examples include magnetic flow meters and devices employing an optical sensor such as an optocoupler.

The signal-conversion circuit of the present invention provides a discrete input wireless transmitter with the capability to detect sensor signal pulses greater than 100 Hz from an industrial sensor, for example, a turbine flow meter, while preserving the low power consumption required of a wireless field device. When incorporated into a terminal block for a discrete input wireless transmitter, the signal-conversion circuit is easily installed to upgrade compatible discrete input wireless transmitters. With this invention, industrial sensors, such as a turbine flow meter without signal conditioning, can now be incorporated into a wireless field device network through a discrete input wireless transmitter incorporating the signal-conversion circuit of the present invention.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An electronic circuit for converting higher-frequency output signals from a sensor into lower-frequency input signals for a discrete input wireless transmitter, the circuit comprising:
    a differential amplifier to amplify the sensor signals as a function of a frequency of the sensor signals;
    a digital comparator to generate a square wave signal by comparing the amplified sensor signals to a fixed reference voltage;
    a digital frequency divider to generate a lower-frequency signal by dividing the square wave signal; and a transistor switch to generate the lower-frequency input signals for the discrete input wireless transmitter by switching as a function of the lower-frequency signal from the digital frequency divider.

2. The electronic circuit of claim 1 wherein the transistor switch comprises an open collector output to generate the lower-frequency input signals for the discrete input wireless transmitter by switching the open collector output as a function of the lower-frequency signal.

3. The electronic circuit of claim 1, wherein transistor switch is a field-effect transistor and the lower-frequency signal generated by the digital frequency divider drives a gate voltage of the field-effect transistor to generate the lower-frequency input signals for the discrete input wireless transmitter.

4. The electronic circuit of claim 1, wherein the higher-frequency output signals from a sensor are output signals from at least one of a turbine flow meter, a magnetic flow meter, and an optocoupler.

5. The electronic circuit of claim 1 wherein the differential amplifier equalizes the amplitude of the sensor signals across frequencies by increasing amplification of the sensor signals as the frequency of the sensor signals decreases.

6. The electronic circuit of claim 1, wherein the differential amplifier comprises:
a filter to limit differential amplification to a range of frequencies.

7. The electronic circuit of claim 1 wherein the digital frequency divider generates a lower-frequency signal by dividing the square wave signal output by a discrete power of two.

8. The electronic circuit of claim 7, wherein the discrete power of two for dividing the square wave signal output is user selectable.

9. A terminal block for converting higher-frequency output signals from a sensor into lower-frequency input signals for a discrete input wireless transmitter, the terminal block comprising:
a plurality of wiring terminals for receiving the higher-frequency output sensor signals;
a transient overvoltage suppression circuit for protecting electronic circuits of the terminal block from transient overvoltage conditions from the plurality of wiring terminals;
a power supply circuit for providing a fixed reference voltage from a local power source to electronic circuits of the terminal block; and
a frequency conversion circuit for converting the higher-frequency output signals from the sensor into the lower-frequency input signals to send to the discrete input wireless transmitter, the frequency conversion circuit comprising:
a differential amplifier to amplify the sensor signals as a function of a frequency of the sensor signals;
a digital comparator to generate a square wave signal by comparing the amplified sensor signals to a fixed reference voltage;
a digital frequency divider to generate a lower-frequency signal by dividing the square wave signal; and
a transistor switch to generate the lower-frequency input signals for the discrete input wireless transmitter by switching as a function of the lower-frequency signal from the digital frequency divider.

10. The terminal block of claim 9 wherein the transistor switch comprises an open collector output to generate the lower-frequency input signals for the discrete input wireless transmitter by switching the open collector output as a function of the lower-frequency signal.

11. The terminal block of claim 9, wherein transistor switch is a field-effect transistor and the lower-frequency signal generated by the digital frequency divider drives a gate voltage of the field-effect transistor to generate the lower-frequency input signals for the discrete input wireless transmitter.

12. The terminal block of claim 9, wherein the higher-frequency output signals from a sensor are output signals from at least one of a turbine flow meter, a magnetic flow meter, and an optocoupler.

13. The terminal block of claim 9, wherein the differential amplifier equalizes the amplitude of the sensor signals across frequencies by increasing amplification of the sensor signals as the frequency of the sensor signals decreases.

14. The terminal block of claim 9, wherein the differential amplifier comprises:
a filter to limit differential amplification to a range of frequencies.

15. The terminal block of claim 9, wherein the digital frequency divider generates a lower-frequency signal by dividing the square wave signal output by a discrete power of two.

16. The terminal block of claim 15, wherein the discrete power of two for dividing the square wave signal output is user selectable.

17. A method for converting a higher-frequency sensor signal into a lower-frequency signal for a discrete input wireless transmitter, the method comprising:
differentially amplifying the higher-frequency sensor signal, wherein the differential amplification is a function of the frequency of the sensor signal;
converting the differentially amplified sensor signal into a square waveform sensor signal;
dividing down the square waveform sensor signal to a lower-frequency square waveform sensor signal; and
switching an output of a transistor as a function of the lower-frequency square waveform sensor signal to provide a lower-frequency input signal for a discrete input wireless transmitter.

18. The method of claim 17, wherein transistor output is an open collector output.

19. The method of claim 17, wherein the higher-frequency sensor signal is at least one of a turbine flow meter output signal, a magnetic flow meter output signal, and an optocoupler output signal.

20. The method of claim 17, wherein differentially amplifying the higher-frequency sensor signal comprises equalizing the amplitude of the sensor signal by amplifying the sensor signal as the frequency of the sensor signal decreases.

21. A wireless field device for measuring flow rate, the device comprising:
a discrete input wireless transmitter to detect discrete input signals, count the detected discrete input signals, and wirelessly transmit the count of discrete input signals to a control or monitoring system;
a turbine flow meter to measure a flow rate, the measurement of the flow rate indicated by a frequency of signal pulses from the turbine flow meter, the frequency of the signal pulses being higher than the frequency at which the discrete input wireless transmitter can detect discrete input signals; and
an electronic circuit to convert the signal pulses from the turbine flow meter into lower-frequency discrete input signals detectable by the discrete input wireless transmitter, the circuit comprising:

a differential amplifier to amplify the signal pulses as a function of the frequency of the signal pulses;

a digital comparator to generate a square wave signal by comparing the amplified signal pulses to a fixed reference voltage;

a digital frequency divider to generate a lower-frequency signal by dividing the square wave signal; and a transistor switch to generate the lower-frequency discrete input signals for the discrete input wireless transmitter by switching as a function of the lower-frequency signal from the digital frequency divider.

\* \* \* \* \*